(12) United States Patent
Gupta et al.

(10) Patent No.: US 12,487,970 B2
(45) Date of Patent: Dec. 2, 2025

(54) CONTAINER-BASED ERASURE CODING

(71) Applicant: Cohesity, Inc., San Jose, CA (US)

(72) Inventors: Apurv Gupta, Bengaluru (IN); Akshat Agarwal, Delhi (IN); Manvendra Singh Tomar, Bengaluru (IN); Donthula Akshith Reddy, Bheemaram (IN); Kushal Singh, Bengaluru (IN); Tarun Kumar Yadav, Rajasthan (IN); Mandar Suresh Naik, Pune (IN)

(73) Assignee: Cohesity, Inc., Santa Clara, CA (US)

( * ) Notice: Subject to any disclaimer, the term of this patent is extended or adjusted under 35 U.S.C. 154(b) by 0 days.

(21) Appl. No.: 18/957,212

(22) Filed: Nov. 22, 2024

(65) Prior Publication Data

US 2025/0086145 A1    Mar. 13, 2025

Related U.S. Application Data

(63) Continuation of application No. 17/582,763, filed on Jan. 24, 2022, now Pat. No. 12,164,477.

(51) Int. Cl.
*G06F 16/174* (2019.01)
(52) U.S. Cl.
CPC ................. *G06F 16/1748* (2019.01)
(58) Field of Classification Search
CPC .................................................. G06F 16/1748
See application file for complete search history.

(56) References Cited

U.S. PATENT DOCUMENTS

| | | | |
|---|---|---|---|
| 11,681,586 B2* | 6/2023 | Terei | G06F 16/128 707/692 |
| 11,687,286 B2* | 6/2023 | Aguilera | G06F 11/10 711/202 |
| 2013/0339818 A1 | 12/2013 | Baker et al. | |
| 2015/0220398 A1* | 8/2015 | Schirripa | G06F 11/1469 707/675 |
| 2016/0378612 A1* | 12/2016 | Hipsh | G06F 11/1451 707/647 |
| 2017/0177473 A1* | 6/2017 | Danilov | G06F 3/0683 |
| 2017/0277630 A1 | 9/2017 | Wideman et al. | |
| 2019/0370170 A1 | 12/2019 | Oltean et al. | |
| 2023/0079486 A1 | 3/2023 | Yarlagadda et al. | |
| 2023/0237020 A1 | 7/2023 | Gupta et al. | |
| 2023/0237029 A1* | 7/2023 | Tal | G06F 16/215 707/692 |

OTHER PUBLICATIONS

Haddock et al., "High Performance Erasure Coding for Very Large Stripe Sizes", 2019 Spring Simulation Conference (SpringSim), IEEE, Apr. 29, 2019, 12 pp.

(Continued)

*Primary Examiner* — Tyler J Torgrimson
(74) *Attorney, Agent, or Firm* — Shumaker & Sieffert, P.A.

(57) ABSTRACT

A repository of replicated chunk files is analyzed to identify chunk files that meet at least a portion of combination criteria. Selected chunk files are associated together under a data protection grouping container. Erasure coding is applied to the data protection grouping container including by utilizing the selected chunk files as different data stripes of the erasure coding and generating one or more parity stripes based on the different data stripes.

20 Claims, 5 Drawing Sheets

(56) References Cited

OTHER PUBLICATIONS

Hu et al., Exploiting Combined Locality for Wide-Stripe Erasure Coding in Distributed Storage, Proceedings of the 19th USENIX Conference on File and Storage Technologies, Feb. 2021, pp. 233-248.
Huang et al., "Erasure Coding in Windows Azure Storage", 2012 USENIX Annual Technical Conference (USENIX ATC 12), 2012, pp. 15-26, (Applicant points out, in accordance with MPEP 609.04(a), that the year of publication, 2012, is sufficiently earlier than the effective U.S. filing date, so that the particular month of publication is not an issue.).
Prosecution History from U.S. Appl. No. 17/582,763, dated Feb. 21, 2023 through Nov. 8, 2024, 95 pp.

* cited by examiner

CONTAINER-BASED ERASURE CODING

CLAIM OF PRIORITY

This application is a continuation of U.S. patent application Ser. No. 17/582,763 entitled CONTAINER-BASED ERASURE CODING filed Jan. 24, 2022, which is incorporated herein by reference in its entirety.

BACKGROUND OF THE INVENTION

Erasure Coding (EC) is a mathematical technique to store logically sequential data associated with an object across a plurality of disks such that in the event one or more of the disks become unavailable, the object is still able to be reconstructed. The object is segmented into a plurality of data stripes. Each data stripe is comprised of one or more data chunks and is stored on a different disk. One or more parity stripes are computed based on the plurality of data stripes and stored separately from the plurality of stripes of the object. The one or more parity stripes enable the object to be reconstructed in the event one or more of the disks storing the data stripes associated with the object become unavailable.

BRIEF DESCRIPTION OF THE DRAWINGS

Various embodiments of the invention are disclosed in the following detailed description and the accompanying drawings.

DETAILED DESCRIPTION

Figure 1:
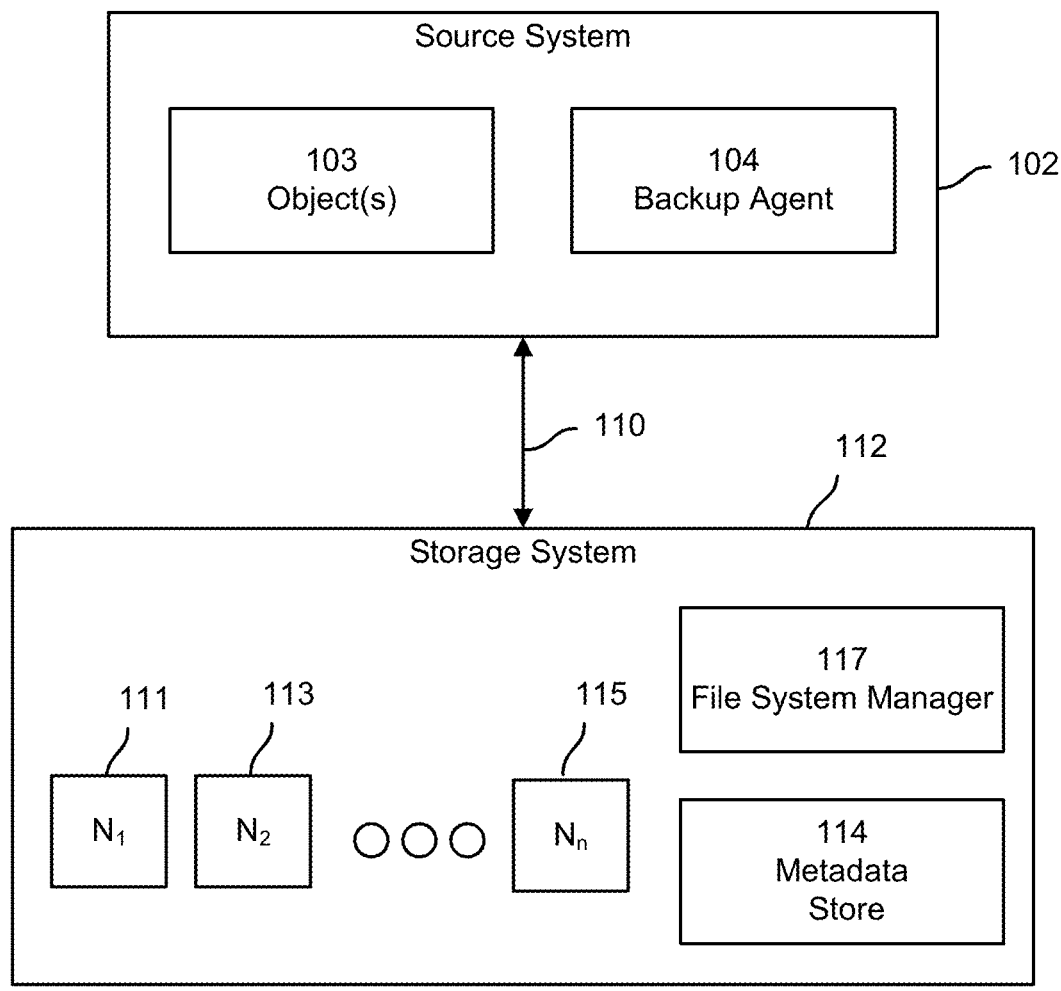
FIG. 1 is a block diagram illustrating an embodiment of a system for container-based erasure coding.

A storage system is comprised of a plurality of storage nodes. Each storage node may include one or more storage devices (e.g., disk storage, solid-state storage, flash storage, etc.). The storage system ingests data from a source system and stores the ingested data across the plurality of storage nodes. The data associated with the ingested data may be written (inline or post process) to a plurality of chunk files. A chunk file may have an EC configuration such that the chunk file is comprised of X data stripes and Y parity stripes. Each of the data stripes and parity stripes associated with the chunk file is stored on a different storage device. The storage system may generate one or more replicas of a chunk file and store the one or more chunk file replicas as an EC stripe (e.g., all the data chunks associated with a replicated chunk file are stored on a single storage node).

The number of storage nodes may be increased to improve fault tolerance (e.g., can support more disk failures). However, some of the available storage devices storing data stripes associated with an object need to be read to reconstruct the object in the event one or more storage nodes storing data stripes associated with the object become unavailable. A width of a data stripe (i.e., the amount of data in one data stripe) may be increased to reduce the overhead associated with writing data to a data stripe. However, increasing the data stripe width may cause an inefficient use of storage space for small data writes (e.g., writing an amount of data that is less than a threshold amount) when applying the EC configuration for some objects.

For example, an EC configuration may require the data associated with a chunk file to be spread across 8 data stripes. A width of a data stripe may be configured to 1 MB. An example of a small data write amount for a 1 MB data stripe width is 256 kb. The storage system may receive a plurality of data chunks associated with an object having a cumulative size of 2 MB. To satisfy the EC configuration, the 2 MB of data is segmented into 256 kb data blocks and stored across 8 different storage devices. Each data stripe in this example stores 25% of its capacity.

To improve the usage of storage space associated with the data stripes, the storage system may perform a post process EC that writes to a new chunk file the data chunks associated with a first chunk file and the data chunks associated with one or more other chunk files. However, such as post process EC requires the data chunks associated with the first and one or more other chunk files to be read, the data chunks associated with the first and one or more other chunk files to be written to the new chunk file, and the metadata associated with data chunks included in the first and one or more other chunk files to be updated to reference the new chunk file instead of the first chunk file or the one or more other chunk files. This post process may require a significant amount of IOPS resources to be performed.

A technique to perform container-based erasure coding is disclosed. Instead of using a portion of a chunk file as a data stripe, the disclosed technique utilizes an entire replicated chunk file as a data stripe. The disclosed technique creates a data protection grouping container (e.g., a logical grouping) for a plurality of replicated chunk files. As a result, the number of post process EC operations and resources needed to perform those operations is reduced because the storage system does not need to write the data chunks associated with a plurality of chunk files to a new chunk file and update the metadata for the data chunks associated with a plurality of chunk files.

The storage system analyzes a repository of replicated chunk files to identify and select a plurality of replicated chunk files that meet at least a portion of combination criteria. Combination criteria may be based on an age of a replicated chunk, a size of a replicated chunk file, whether a replicated chunk file includes non-deduplicated data chunks, a storage device storing a replicated chunk file, a storage node that includes the storage device storing the replicated chunk file, a chassis including the storage node that includes the storage device storing the replicated chunk file, a rack including the chassis including the storage node that includes the storage device storing the replicated chunk file, and/or a combination thereof.

A portion of the combination criteria is at least satisfied in the event the subsequent replicated chunk file is stored on a different storage device as the first replicated chunk file. In some embodiments, the storage device storing a replicated chunk file excludes cloud storage devices (e.g., cloud disks). In some embodiments, additional combination criteria also need to be satisfied. In some embodiments, the additional criteria includes an age of the subsequent replicated chunk file is older than a threshold age, a size of the subsequent replicated chunk file is within a threshold size of the first replicated chunk file, the subsequent replicated chunk file includes non-deduplicated data chunks, a storage node that includes the storage device storing the subsequent replicated chunk file is different than a storage node that includes the storage device storing the first replicated chunk file, a chassis including a storage node that includes a storage device storing the subsequent replicated chunk file is different than a chassis including a storage node that includes a storage device storing the first replicated chunk file, and/or a rack including a chassis that includes a storage node that includes a storage device storing the subsequent replicated chunk file is different than a rack including a chassis that includes a storage node that includes a storage device storing the first replicated chunk file.

The storage system may store one or more replicas of a chunk file that are stored on one or more different storage devices of the storage system. After the storage system selects the initial replicated chunk file, the storage system is prevented from including in the data protection grouping container one or more other replicated chunk files that are stored on the same storage device as the selected replicated chunk file. As one or more additional replicated chunk files are included in the data protection grouping container, the storage system is prevented from including in the data protection grouping container one or more replicated chunk files that are stored on one or more storage devices storing one or more replicated chunk files that are already included in the data protection grouping container. That is, a valid data protection grouping container may not include multiple replicated chunk files stored on the same storage device.

An EC configuration may specify the number of data stripes and the number of parity stripes. The storage system may not select more replicated chunk files to be data stripes than specified by the EC configuration.

After the plurality of replicated chunk files are selected, the storage system applies erasure coding to the data protection grouping container by utilizing the selected replicated chunk files as different data stripes of the erasure coding and generating one or more parity stripes based on the different data stripes. A generated parity stripe is stored as a chunk file on a storage device. The one or more parity stripes are stored on one or more storage devices that are different from the storage devices storing the plurality of replicated chunk files. A chunk file may be associated with a plurality of chunk file replicas. After the data protection group container is created, the non-selected chunk file replicas associated with the replicated chunk files included in the data protection group container may be deleted to recover storage space.

The storage system maintains a data protection grouping container metadata table. The data protection grouping container metadata table is updated to identify the plurality of data stripes and the one or more parity stripes that are included in a data protection grouping container and a corresponding storage location for each of the data stripes and the one or more parity stripes. In the event a storage device storing a replicated chunk file included in a data protection grouping container becomes unavailable, the storage system may utilize the data protection grouping container metadata table, the remaining data stripes, and the one or more parity stripes to reconstruct the replicated chunk file.

At some point in time, the data chunks associated with the replicated chunk files included in a data protection grouping container may have been garbage collected and removed from the storage system. The storage system may delete the data protection grouping container in the event a corresponding measure of unreferenced data chunks associated with one or more replicated chunk files included in the data protection group container is greater than a garbage collection threshold. In some embodiments, the data protection grouping container is deleted in the event a threshold number of replicated chunk files included in the data protection group container have a corresponding measure of unreferenced data that is greater than the garbage collection threshold. The remaining data chunks associated with the replicated chunk files having a corresponding measure of unreferenced data that is greater than the garbage collection threshold may be rewritten to one or more new chunk files. The storage system may select the one or more new chunk files to include in a new data protection grouping container.

FIG. 1 is a block diagram illustrating an embodiment of a system 100 for container-based erasure coding. In the example shown, source system 102 is coupled to storage system 112 via network connection 110. Network connection 110 may be a LAN, WAN, intranet, the Internet, and/or a combination thereof.

Source system 102 is a computing system that stores file system data. The file system data may include a plurality of files (e.g., content files, text files, object files, etc.) and metadata associated with the plurality of files. Source system 102 may be comprised of one or more servers, one or more computing devices, one or more storage devices, and/or a combination thereof. A backup of source system 102 may be performed according to one or more backup policies. In some embodiments, a backup policy indicates that file system data is to be backed up on a periodic basis (e.g., hourly, daily, weekly, monthly, etc.), when a threshold size of data has changed, or in response to a command from a user associated with source system 102.

Source system 102 may be configured to run one or more objects 103. Examples of objects include, but are not limited to, a virtual machine, a database, an application, a container, a pod, etc. Source system 102 may include one or more storage volumes (not shown) that are configured to store file system data associated with source system 102. The file system data associated with source system 102 includes the data associated with the one or more objects 103.

Backup agent 104 may be configured to cause source system 102 to perform a backup (e.g., a full backup or incremental backup). A full backup may include all of the file system data of source system 102 at a particular moment in time. In some embodiments, a full backup for a particular object of the one or more objects 103 is performed and the full backup of the particular object includes all of the object data associated with the particular object at a particular moment in time. An incremental backup may include all of the file system data of source system 102 that has not been backed up since a previous backup. In some embodiments, an incremental backup for a particular object of the one or more objects 103 is performed and the incremental backup of the particular object includes all of the object data associated with the particular object that has not been backed up since a previous backup.

In some embodiments, backup agent 104 is running on source system 102. In some embodiments, backup agent 104 is running in one of the one or more objects 103. In some embodiments, a backup agent 104 is running on source system 102 and a separate backup agent 104 is running in one of the one or more objects 103. In some embodiments, an object includes a backup function and is configured to perform a backup on its own without backup agent 104. In some embodiments, source system 102 includes a backup function and is configured to perform a backup on its own without backup agent 104. In some embodiments, storage system 112 may provide instructions to source system 102, causing source system 102 to execute backup functions without the backup agent 104.

Storage system 112 includes storage nodes 111, 113, 115. Although three storage nodes are shown, storage system 112 may be comprised of n storage nodes.

In some embodiments, the storage nodes are homogenous nodes where each storage node has the same capabilities (e.g., processing, storage, memory, etc.). In some embodiments, at least one of the storage nodes is a heterogeneous node with different capabilities (e.g., processing, storage, memory, etc.) than the other storage nodes of storage system 112.

In some embodiments, a storage node of storage system 112 includes a processor, memory, and a plurality of storage devices. A storage device may be a solid-state drive, a hard disk drive, a flash storage device, etc. The plurality of storage devices may include one or more solid state drives, one or more hard disk drives, one or more flash storage devices, or a combination thereof.

In some embodiments, a storage node of storage system 112 includes a processor and memory, and is coupled to a separate storage appliance. The separate storage appliance may include one or more storage devices (e.g., flash storage devices). A storage device may be segmented into a plurality of partitions. Each of the storage nodes 111, 113, 115 may be allocated one or more of the partitions. The one or more partitions allocated to a storage node may be configured to store data associated with some or all of the plurality of objects that were backed up to storage system 112. For example, the separate storage device may be segmented into 10 partitions and storage system 112 may include 10 nodes. A storage node of the 10 storage nodes may be allocated one of the 10 partitions.

In some embodiments, a storage node of storage system 112 includes a processor, memory, and a storage device. The storage node may be coupled to a separate storage appliance. The separate storage device may include one or more storage devices. A storage device may be segmented into a plurality of partitions. Each of the nodes 111, 113, 115 may be allocated one or more of the partitions. The one or more partitions allocated to a storage node may be configured to store data associated with some or all of the plurality of objects that were backed up to storage system 112. For example, the separate storage device may be segmented into 10 partitions and storage system 112 may include 10 storage nodes. A storage node of the 10 storage nodes may be allocated one of the 10 partitions.

Storage system 112 may be a cloud instantiation of a backup system. A configuration of cloud instantiation of storage system 112 may be a virtual replica of a backup system. For example, a backup system may be comprised of three storage nodes, each storage node with a storage capacity of 10 TB. A cloud instantiation of the backup system may be comprised of three virtual nodes, each virtual node with a storage capacity of 10 TB. In other embodiments, a cloud instantiation of a backup system may have more storage capacity than an on-premises instantiation of a backup system. In other embodiments, a cloud instantiation of a backup system may have less storage capacity than an on-premises instantiation of a backup system.

Storage system 112 performs a data management operation (e.g., backup, replication, tiering, migration, archiving, etc.) for source system 102 by ingesting data from source system 102 and storing the data as a plurality of data chunks in one or more chunk files that are stored on one or more storage devices associated with one or more storage nodes 111, 113, 115 of storage system 112.

Storage system 112 includes a file system manager 117 that is configured to generate metadata that organizes the file system data of the backup. An example of metadata generated by the storage system is a tree data structure as described in U.S. patent application Ser. No. 17/476,873 entitled MANAGING OBJECTS STORED AT A REMOTE STORAGE file Sep. 16, 2021, which is incorporated herein by reference for all purposes. Storage system 112 may store a plurality of tree data structures in metadata store 114, which is accessible by storage nodes 111, 113, 115. Storage system 112 may generate a snapshot tree and one or more corresponding metadata structures for each data management operation performance. Metadata store 114 may be stored in a memory of storage system 112. Metadata store 114 may be a distributed metadata store and stored in the memories of storage nodes 111, 113, 115.

In the event performing the data management operation corresponds to performing the data management operation with respect to all of the file system data of source system 102, a view corresponding to the data management operation performance may be comprised of a snapshot tree and one or more object metadata structures. The snapshot tree may be configured to store the metadata associated with source system 102. An object metadata structure may be configured to store the metadata associated with one of the one or more objects 103. Each of the one or more objects 103 may have a corresponding metadata structure.

In the event performing the data management operation corresponds to performing the data management operation with respect to all of the object data of one of the one or more objects 103 (e.g., a backup of a virtual machine), a view corresponding to the data management operation performance may be comprised of a snapshot tree and one or more object file metadata structures. The snapshot tree may be configured to store the metadata associated with one of the one or more objects 103. An object file metadata structure may be configured to store the metadata associated with an object file included in the object.

The tree data structure may be used to capture different views of data. A view of data may correspond to a full backup, an incremental backup, a clone of data, a file, a replica of a backup, a backup of an object, a replica of an object, a tiered object, a tiered file, etc. The tree data structure allows a chain of snapshot trees to be linked together by allowing a node of a later version of a snapshot tree to reference a node of a previous version of a snapshot tree. For example, a root node or an intermediate node of a snapshot tree corresponding to a second backup may reference an intermediate node or leaf node of a snapshot tree corresponding to a first backup.

A snapshot tree is a representation of a fully hydrated restoration point because it provides a complete view of source system 102, an object 103, or data generated on or by the storage system 112 at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, storage system 112 maintains fully hydrated restoration points. Any file associated with source system 102, an object at a particular time and the file's contents, or a file generated on or by storage system 112, for which there is an associated reference restoration point, may be determined from the snapshot tree, regardless if the associated reference restoration was a full reference restoration point or an intermediate reference restoration point.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a metadata structure (e.g., object metadata structure or an object file metadata structure), a pointer to a data chunk stored on the storage cluster, etc.

A metadata structure (e.g., object file metadata structure, object metadata structure, file metadata structure) may include a root node, one or more levels of one or more intermediate nodes associated with the root node, and one or more leaf nodes associated with an intermediate node of the lowest intermediate level. The tree data structure associated with a metadata structure allows a chain of metadata structures corresponding to different versions of an object, an object file, or a file to be linked together by allowing a node of a later version of a metadata structure to reference a node of a previous version of a metadata structure.

A leaf node of a metadata structure may store metadata information, such as an identifier of a data brick associated with one or more data chunks and information associated with the one or more data chunks. In some embodiments, the information associated with the one or more data chunks includes corresponding object offsets and corresponding chunk identifiers associated with the one or more data chunks. In some embodiments, the information associated with the one or more data chunks also includes corresponding chunk file identifiers associated with one or more chunk files storing the data chunks.

In some embodiments, the location of the one or more data chunks associated with a data brick is identified using a chunk metadata data structure and a chunk file metadata data structure stored in metadata store 114. In some embodiments, the location of the one or more data chunks associated with a data brick is identified using a chunk file metadata data structure stored in metadata store 114. The chunk file metadata data structure may include a plurality of entries where each entry associates a chunk identifier associated with a data chunk with a chunk file identifier of a chunk file storing the data chunk, an offset, and a size. The chunk file metadata structure may indicate which storage node of storage system 112 is storing a replicated chunk file. The chunk file metadata structure may indicate a storage node of storage system 112 storing a data chunk that is part of a chunk file stored across a plurality of storage nodes.

In some embodiments, for data chunks having an entry in the chunk metadata data structure, the location of a data chunk may be determined by traversing a tree data structure to a leaf node and determining a chunk identifier associated with the data chunk. The chunk metadata data structure may be used to determine a chunk file identifier of a chunk file storing the data chunk. The chunk file metadata data structure may be used to determine a location of the data chunk within the chunk file corresponding to the determined chunk file identifier.

Storage system 112 maintains in metadata store 114 a data protection grouping container metadata table. The data protection grouping container metadata table includes a corresponding entry for each data protection grouping metadata table. An entry indicates the plurality of replicated chunk files included in a data protection grouping metadata table and the corresponding storage nodes storing each of the plurality of replicated chunk files. The entry also indicates the one or more parity stripes included in a data protection grouping metadata table and the one or more corresponding storage nodes storing each of the one or more parity stripes.

In some embodiments, a chunk file is an RF1 (replication factor 1) chunk file, i.e., no replica of the chunk file. In some embodiments, the data protection grouping container includes an RF1 chunk file in response to a determination that the RF chunk file satisfies the combination criteria. The data protection grouping container that includes the RF1 chunk file includes a plurality of other chunk file replicas having a replication factor that is greater than one.

In some embodiments, a plurality of parity stripes is determined. Such parity stripes may be determined using local reconstruction codes (LRC). A first parity stripe may be based on all of the data stripes included in the data protection grouping container. A second parity stripe may be based on a first subset of the data stripes included in the data protection grouping container. One or more other parity stripes may be based on one or more other subsets of the data stripes included in the data protection grouping container.

In some embodiments, parity stripe replicas may be computed and stored on different storage devices than the parity stripe of which it is a replica. For example, a first global parity stripe (e.g., computed based on all of the data stripes included in the data protection grouping container) may be stored on a first storage device and a replica of the first global parity stripe may be stored on a second storage device. A first local parity stripe (e.g., computed based on a subset of the data stripes included in the data protection grouping container) may be stored on a third storage device and a replica of the first local parity stripe may be stored on a fourth storage device. One or more other parity stripes may be stored on one or more corresponding storage devices and one or more corresponding replicas of the one or more other parity stripes may be stored on one or more other storage devices.

Figure 2:
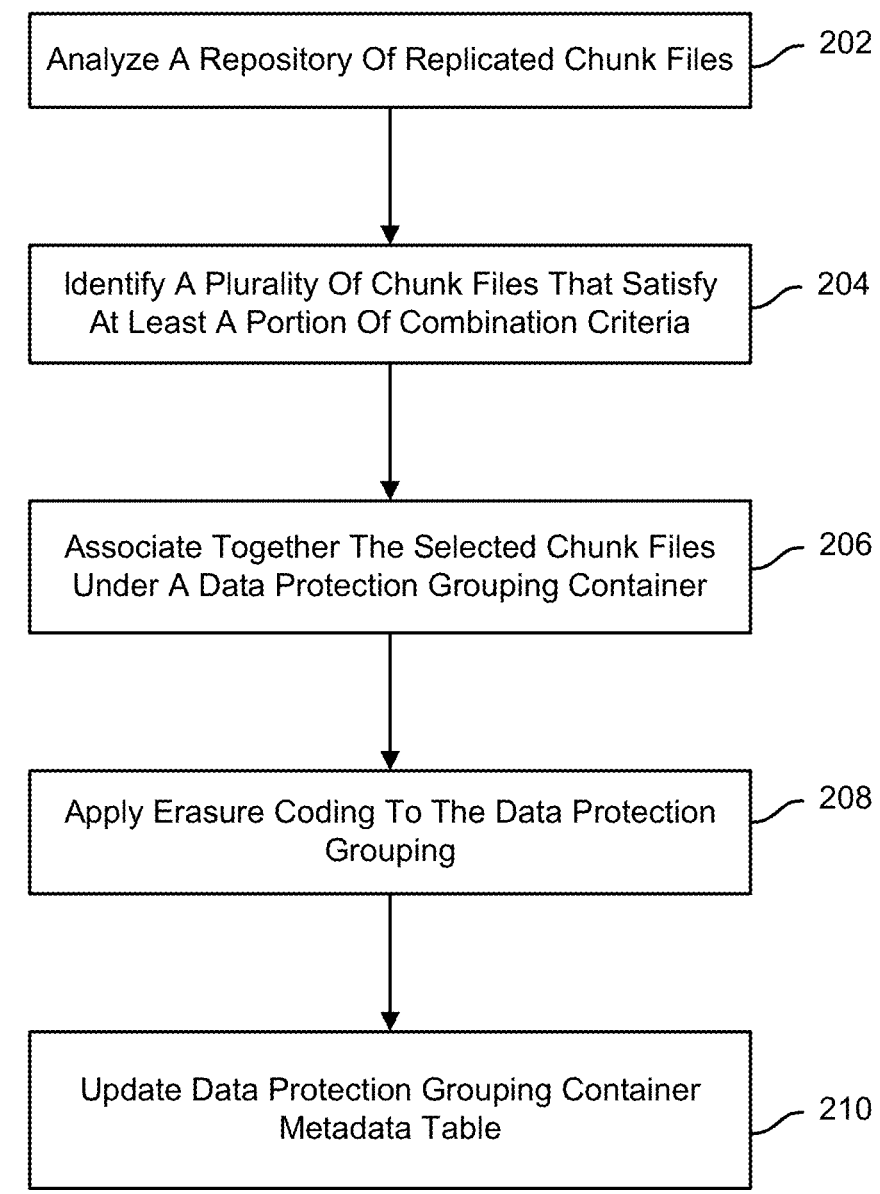
FIG. 2 is a flow diagram illustrating a process of container-based erasure coding in accordance with some embodiments.

FIG. 2 is a flow diagram illustrating a process of container-based erasure coding in accordance with some embodiments. In the example shown, process 200 may be implemented by a storage system, such as storage system 112.

At 202, a repository of replicated chunk files is analyzed. A storage system ingests data from a source system and stores the ingested data to one or more chunk files. The data included in a chunk file is stored across a plurality of storage devices associated with the storage system. The storage system replicates the data included in a chunk file to one or more replica chunk files. A replicated chunk file is stored on one of the storage devices associated with the storage system.

The storage system maintains a chunk file metadata data structure. An entry of the chunk file metadata data structure associates a chunk file identifier associated with a chunk file with one or more chunk identifiers associated with the one or more data chunks included in the chunk file. The entry may indicate a storage node on or storage device in which a data chunk included in the chunk file is stored. In some embodiments, the data chunks associated with a chunk file (e.g., an original chunk file) are stored across a plurality of storage devices. In some embodiments, the data chunks associated with a chunk file (e.g., a replication factor 3 (RF3) chunk file) are stored on a single storage device. In some embodiments, multiple copies of data chunks associated with a chunk file are stored on different storage devices.

At 204, a plurality of chunk files that satisfy at least a portion of the combination criteria are identified. Combination criteria may be based on an age of a replicated chunk, a size of a replicated chunk file, whether a replicated chunk file includes non-deduplicated data chunks, a storage device storing a replicated chunk file, a storage node that includes the storage device storing the replicated chunk file, a chassis including the storage node that includes the storage device storing the replicated chunk file, a rack including the chassis including the storage node that includes the storage device storing the replicated chunk file, and/or a combination thereof.

The portion of the combination criteria is at least satisfied in the event the subsequent replicated chunk file is stored on a different storage device as the first replicated chunk file. In some embodiments, the storage device storing a replicated chunk file excludes cloud storage devices (e.g., cloud disks). In some embodiments, additional combination criteria also need to be satisfied. In some embodiments, the additional criteria includes an age of the subsequent replicated chunk file is older than a threshold age, a size of the subsequent replicated chunk file is within a threshold size of the first replicated chunk file, the subsequent replicated chunk file includes non-deduplicated data chunks, a storage node that includes the storage device storing the subsequent replicated chunk file is different than a storage node that includes the storage device storing the first replicated chunk file, a chassis including a storage node that includes a storage device storing the subsequent replicated chunk file is different than a chassis including a storage node that includes a storage device storing the first replicated chunk file, and/or a rack including a chassis that includes a storage node that includes a storage device storing the subsequent replicated chunk file is different than a rack including a chassis that includes a storage node that includes a storage device storing the first replicated chunk file.

The storage system may store one or more replicas of a chunk file that are stored on one or more different storage devices of the storage system. After the storage system selects the initial replicated chunk file, the storage system is prevented from including in the data protection grouping container one or more other replicated chunk files that are stored on the same storage device as the selected replicated chunk file. As one or more additional replicated chunk files are included in the data protection grouping container, the storage system is prevented from including in the data protection grouping container one or more replicated chunk files that are stored on one or more storage devices storing one or more replicated chunk files that are already included in the data protection grouping container.

The storage system may not select more replicated chunk files than the number of storage devices associated with the storage system. An EC configuration may specify the number of data stripes and the number of parity stripes. The storage system may not select more replicated chunk files to be data stripes than specified by the EC configuration.

In some embodiments, a data stripe is contained within a storage device, e.g., a single disk. In some embodiments, a data stripe is contained within a storage node, but spread across multiple storage devices.

In some embodiments, all of the chunk files that satisfy the portion of the combination criteria are replicated chunk files. In some embodiments, at least one of the chunk files is a non-replicated chunk file.

At 206, the selected chunk files are associated together under a data protection grouping container. The storage system maintains a data protection grouping container metadata table. The data protection grouping container metadata table is updated to identify the plurality of data stripes that are included in a data protection grouping container and a corresponding storage location for each of the data stripes.

At 208, erasure coding is applied to the data protection grouping. The storage system applies erasure coding to the selected chunk files by utilizing the selected chunk files as different data stripes of the erasure coding and generating one or more parity stripes based on the different data stripes. Erasure coding is applied based on the EC configuration. In the event multiple parity stripes are generated, each parity stripe is stored on a different storage device. The one or more generated parity stripes are stored on a different storage device than the storage devices associated with the different data stripes of the erasure coding.

At 210, a data protection grouping container metadata table is updated. The data protection grouping container metadata table is updated to identify the one or more parity stripes that are included in a data protection grouping container and a corresponding storage location for each of the one or more parity stripes.

Figure 3:
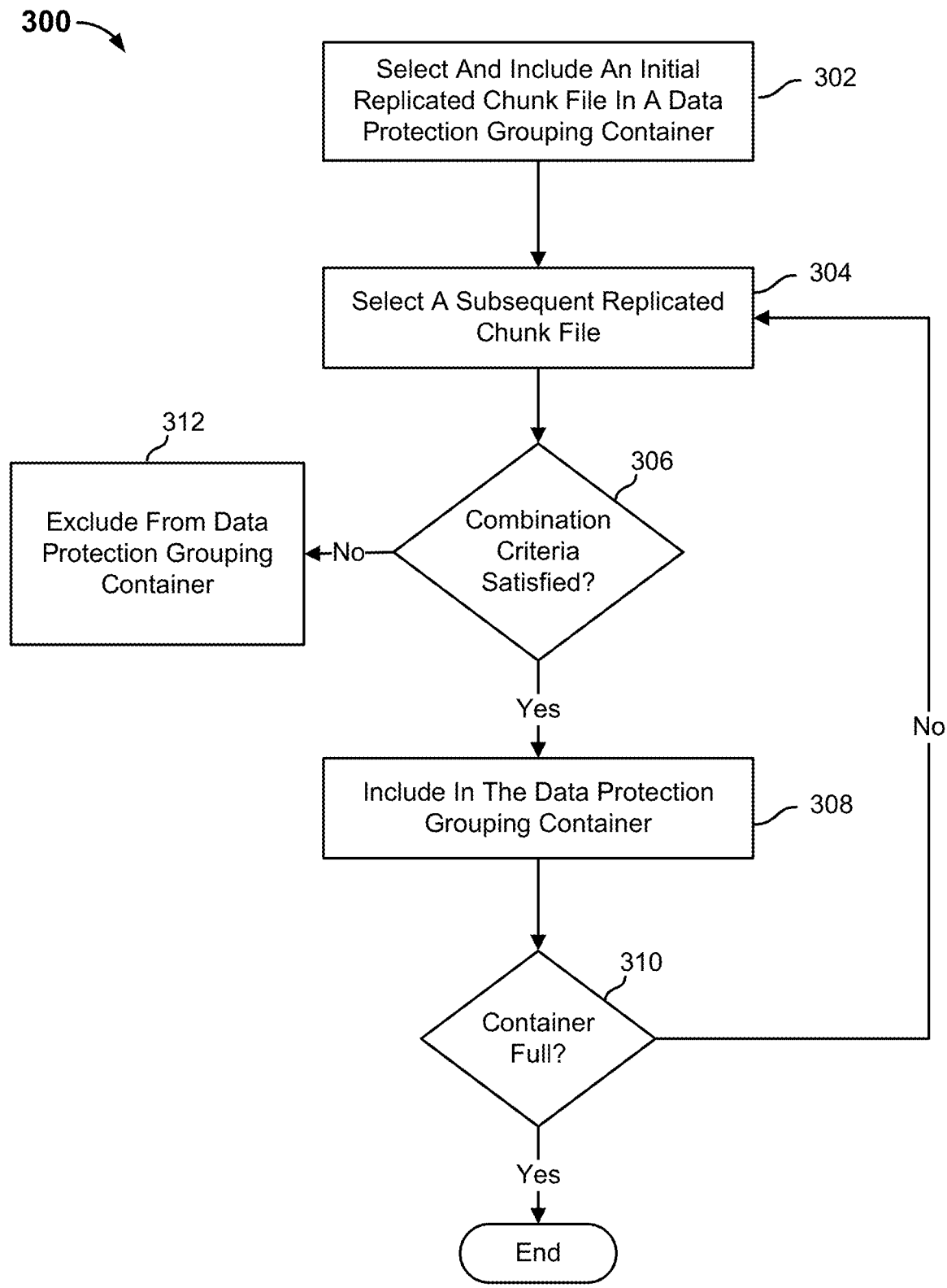
FIG. 3 is a flow diagram illustrating a process for selecting replicated chunk files in accordance with some embodiments.

FIG. 3 is a flow diagram illustrating a process for selecting replicated chunk files in accordance with some embodiments. In the example shown, process 300 may be implemented by a storage system, such as storage system 112. In some embodiments, process 300 is implemented to perform some or all of step 204 of process 200.

A storage system stores a plurality of replicated chunk files. At 302, a first replicated chunk file is selected and included in a data protection grouping container. In some embodiments, the first replicated chunk file is older than a threshold age. In some embodiments, the first replicated chunk file is comprised of non-deduplicated data chunks. At 304, a subsequent replicated chunk file is selected.

At 306, it is determined whether at least a portion of the combination criteria is satisfied. Combination criteria may be based on an age of a replicated chunk, a size of a replicated chunk file, whether a replicated chunk file includes non-deduplicated data chunks, a storage device storing a replicated chunk file, a storage node that includes the storage device storing the replicated chunk file, a chassis including the storage node that includes the storage device storing the replicated chunk file, a rack including the chassis including the storage node that includes the storage device storing the replicated chunk file, and/or a combination thereof.

The portion of the combination criteria is at least satisfied in the event the subsequent replicated chunk file is stored on a different storage device as the first replicated chunk file. In some embodiments, the storage device storing a replicated chunk file excludes cloud storage devices (e.g., cloud disks). In some embodiments, additional combination criteria also need to be satisfied. In some embodiments, the additional criteria includes an age of the subsequent replicated chunk file is older than a threshold age, a size of the subsequent replicated chunk file is within a threshold size of the first replicated chunk file, the subsequent replicated chunk file includes non-deduplicated data chunks, a storage node that includes the storage device storing the subsequent replicated chunk file is different than a storage node that includes the storage device storing the first replicated chunk file, a chassis including a storage node that includes a storage device storing the subsequent replicated chunk file is different than a chassis including a storage node that includes a storage device storing the first replicated chunk file, and/or a rack including a chassis that includes a storage node that includes a storage device storing the subsequent replicated chunk file is different than a rack including a chassis that includes a storage node that includes a storage device storing the first replicated chunk file.

In the event the portion of the combination criterion is satisfied, process 300 proceeds to 308. In the event the portion of the combination criteria is not satisfied, process 300 proceeds to 312.

At 308, the selected subsequent replicated chunk file is included in the data protection grouping container.

At 310, it is determined whether the data protection grouping container is full. An EC configuration may specify the number of data stripes and parity stripes. The data protection grouping container may be full in the event an additional replicated chunk file causes the number of data stripes to exceed the number of data stripes specified in the EC configuration.

In the event it is determined that the data protection grouping container is not full, process 300 returns to step 304. In the event it is determined that the data protection grouping container is full, process 300 ends.

At 312, the selected subsequent replicated chunk file is excluded from the data protection grouping container.

Figure 4:
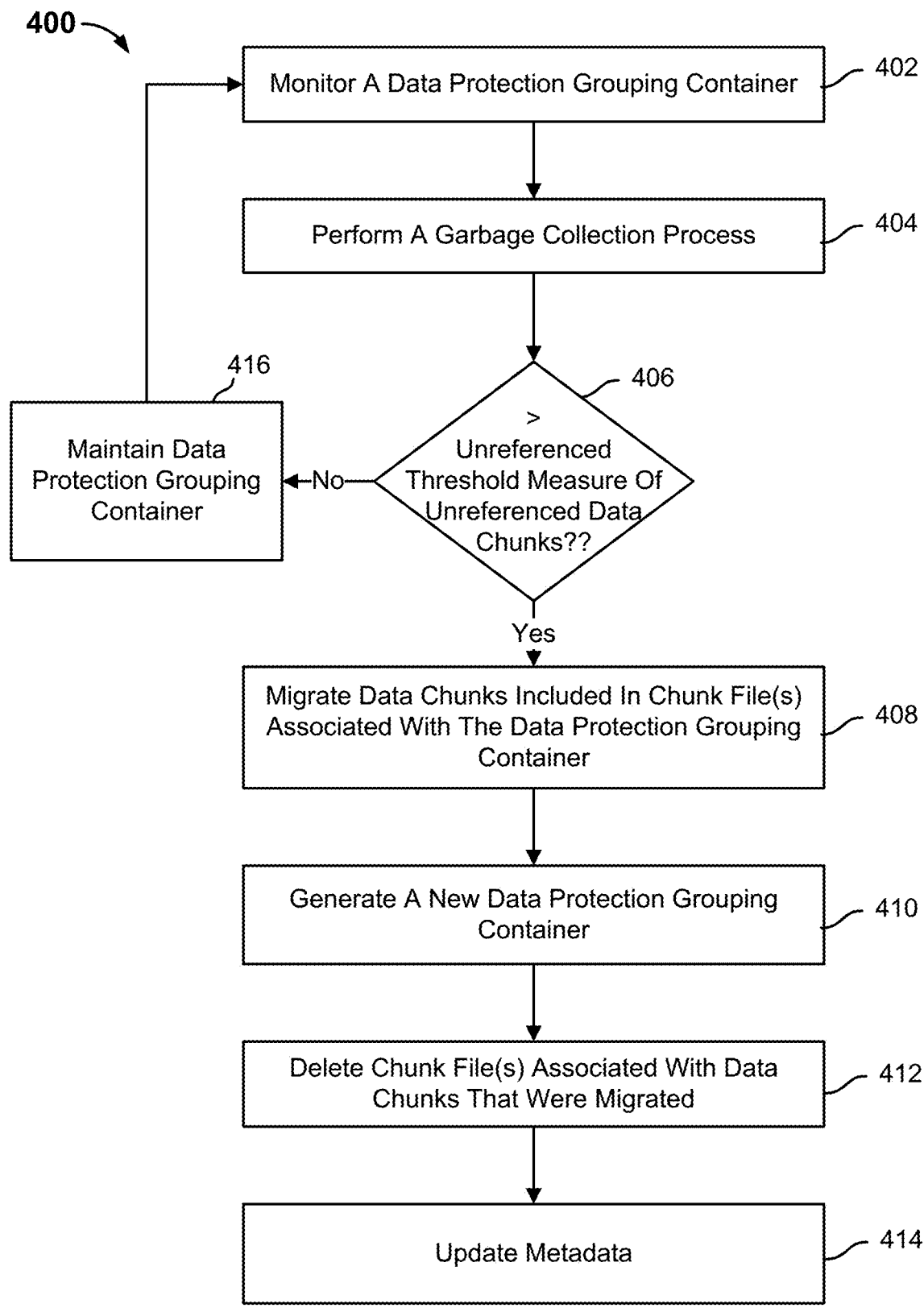
FIG. 4 is a flow diagram illustrating a process for generating a new data protection grouping container.

FIG. 4 is a flow diagram illustrating a process for generating a new data protection grouping container. In the example shown, process 400 may be implemented by a storage system, such as storage system 112.

At 402, a data protection grouping container is monitored. The data protection grouping container is comprised of a plurality of chunk files. A chunk file may be comprised of one or more data chunks.

At 404, a garbage collection process is performed. The garbage collection process may scan a plurality of chunk files and determine a corresponding measure of unreferenced data chunks associated with each of the chunk files. In some embodiments, the determined measure of unreferenced data chunks associated with a chunk file is an amount of data chunks associated with the chunk file that is unreferenced. In some embodiments, the determined measure of unreferenced data chunks associated with a chunk file is a percentage of data chunks associated with the chunk file that is unreferenced.

At 406, it is determined whether a determined measure of unreferenced data chunks is greater than a threshold measure of unreferenced data chunks. In some embodiments, the storage system compares an amount of a chunk file that is unreferenced to a threshold amount. In some embodiments, the storage system compares a percentage of a chunk file that is unreferenced to a threshold percentage. In some embodiments, the storage system compares a number of chunk files included in the data protection grouping container having a corresponding measure of unreferenced data chunks to a data protection grouping container threshold amount. In some embodiments, the storage system compares a percentage of the chunk files included in the data protection grouping container that is unreferenced to a data protection grouping container threshold percentage.

In the event the determined measure of referenced data chunks is greater than a threshold measure of unreferenced data chunks, process 400 proceeds to 408. In the event the determined value is not greater than the threshold measure of unreferenced data chunks, process 400 proceeds to 416.

At 408, data chunks remaining in the chunk file(s) associated with chunk file(s) having a corresponding measure of unreferenced data that is greater than the garbage collection threshold are migrated to one or more new chunk files.

At 410, a new data protection grouping container that includes at least one of the one or more new chunk files is generated.

At 412, the one or more chunk files having data chunks that were migrated to one or more new chunk files are deleted.

At 414, metadata is updated. A chunk file metadata data structure is updated to remove entries corresponding to the one or more chunk files having data chunks that were migrated to one or more new chunk files. The chunk file metadata data structure is updated to include one or more entries corresponding to the one or more new chunk files.

A data protection grouping container metadata table is updated to include an entry for the new data protection grouping container. The entry indicates the chunk files included in the new data protection grouping container and a corresponding storage device for the chunk files. The data protection grouping container metadata table may be updated to remove an entry corresponding to the data protection grouping container.

At 416, the data protection grouping container is maintained.

Figure 5:
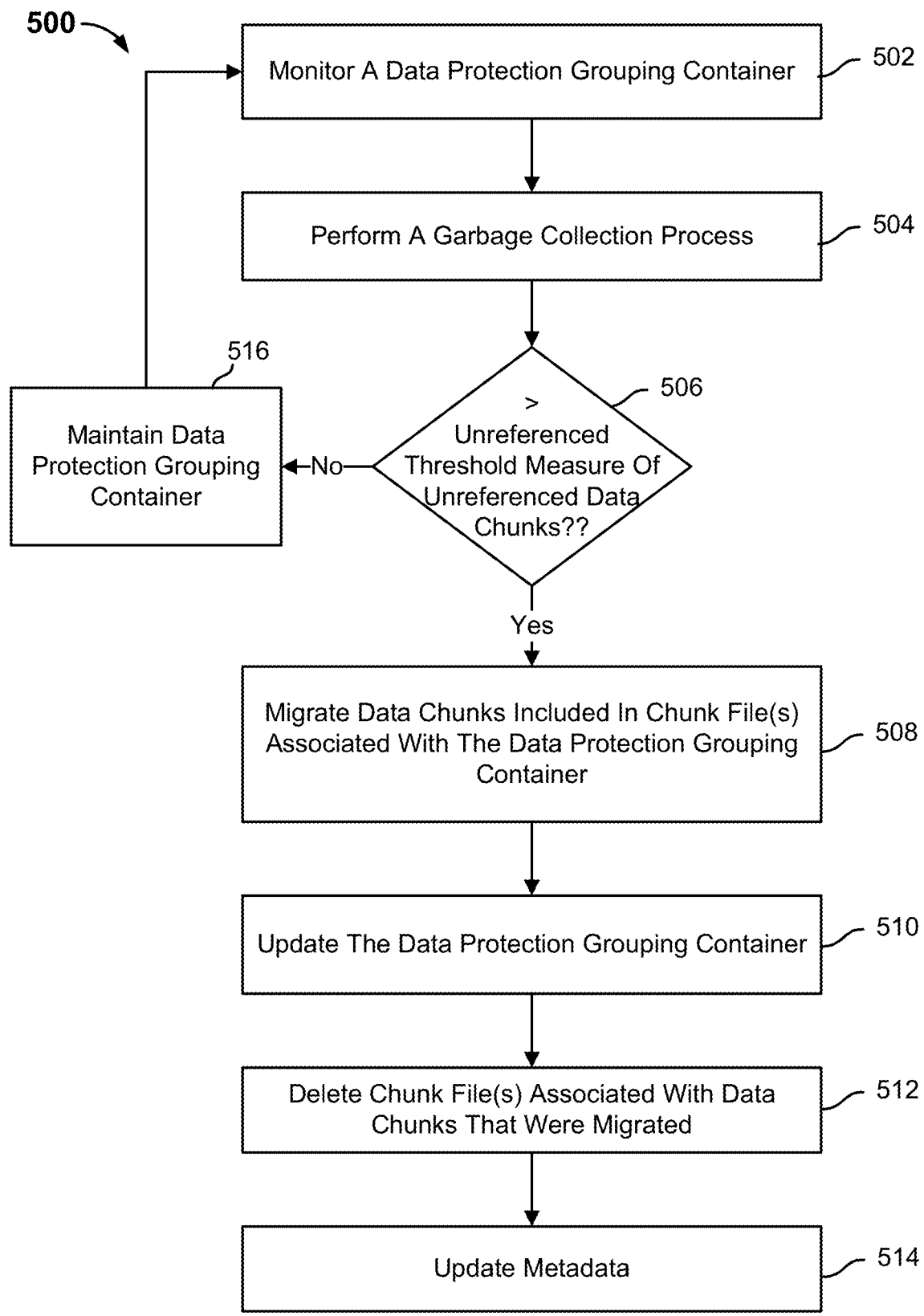
FIG. 5 is a flow diagram illustrating a process for updating a data protection grouping container.

FIG. 5 is a flow diagram illustrating a process for updating a data protection grouping container. In the example shown, process 500 may be implemented by a storage system, such as storage system 112.

At 502, a data protection grouping container is monitored. The data protection grouping container is comprised of a plurality of chunk files. Each chunk file is comprised of one or more data chunks.

At 504, a garbage collection process is performed. The garbage collection process may scan a plurality of chunk files and determine a corresponding measure of unreferenced data chunks associated with each of the chunk files. In some embodiments, the measure of unreferenced data chunks associated with a chunk file is an amount of a chunk file that is unreferenced. In some embodiments, the measure of unreferenced data chunks associated with a chunk file is a percentage of a chunk file that is unreferenced. The storage system may determine a cumulative amount or percentage of the chunk files included in the data protection grouping container that is unreferenced based on the determined corresponding measures of unreferenced data chunks.

At 506, it is determined whether a determined measure of unreferenced data chunks is greater than a threshold measure of unreferenced data chunks. In some embodiments, the storage system compares an amount of a chunk file that is unreferenced to an unreferenced threshold amount. In some embodiments, the storage system compares a percentage of a chunk file that is unreferenced to an unreferenced threshold percentage. In some embodiments, the storage system compares a cumulative amount of the chunk files included in the data protection grouping container that is unreferenced to a cumulative unreferenced threshold amount. In some embodiments, the storage system compares a cumulative percentage of the chunk files included in the data protection grouping container that is unreferenced to a cumulative unreferenced threshold percentage In the event at least one of the determined values associated with the plurality of chunk files that are included in the data protection grouping container is greater than a threshold measure of unreferenced data chunks, process 500 proceeds to 508. In the event none of the determined values associated with the plurality of chunk files that are included in the data protection grouping container are greater than a threshold measure of unreferenced data chunks, process 500 proceeds to 516.

At 508, data chunks remaining in the chunk file(s) that have a determined measure of unreferenced data chunks that is greater than a threshold measure of unreferenced data chunks are migrated to one or more new chunk files (e.g., the data chunks in one or more replicated chunk files are removed from the data protection grouping container).

At 510, the data protection grouping container is updated to include one or more new replicated chunk files. The one or more chunk files having data chunks that were migrated to one or more new chunk files are deleted. An EC configuration is specified for the data protection grouping container. The number of chunk files that have a determined measure of unreferenced data chunks that is greater than the threshold measure of unreferenced data chunks is equal to the number of new replicated chunk files that are to be included in the data protection grouping container. The one or more new replicated chunk files are selected based on the combination criteria described herein. One or more new parity stripes are generated based on the one or more new replicated chunk files and the existing replicated chunk files associated with the data protection grouping container.

At 512, the one or more chunk files having data chunks that were migrated to one or more new chunk files are deleted.

At 514, metadata is updated. A chunk file metadata data structure is updated to remove entries corresponding to the one or more chunk files having data chunks that were migrated to one or more new chunk files. The chunk file metadata data structure is updated to include one or more entries corresponding to the one or more new chunk files.

A data protection grouping container metadata table is updated. The entry for the data protection grouping container is updated to include information associated with the one or more new replicated chunk files and the one or more new parity stripes. The entry indicates a corresponding storage device for the one or more new replicated chunk files and the one or more new parity stripes.

At 516, the data protection grouping container is maintained.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   selecting one or more replicated chunk files stored on a first storage device associated with an original chunk file stored on a second storage device different than the first storage device;
   updating a metadata table to indicate the one or more replicated chunk files selected are associated with a data protection grouping container without updating metadata within the one or more replicated chunk files associated with the data protection grouping container; and
   applying erasure coding to the data protection grouping container, including utilizing the one or more replicated chunk files associated with the data protection grouping container as different data stripes of the erasure coding and generating one or more parity stripes based on the different data stripes.

2. The method of claim 1, further comprising:
   selecting the one or more replicated chunk files based on combination criteria including at least the one or more replicated chunk files stored on the first storage device different from the second storage device to which the original chunk file is stored.

3. The method of claim 2, further comprising:
   selecting the one or more replicated chunk files based on the combination criteria further including on one or more of:
   an age of one of the one or more replicated chunk files selected, a size of the one of the one or more replicated chunk files selected, whether the one of the one or more replicated chunk files selected includes non-deduplicated data chunks, a storage node that includes the first storage device or the second storage device storing the one of the one or more replicated chunk files selected, a chassis including the storage node that includes the first storage device or the second storage device storing the one of the one or more replicated chunk files selected, and/or a rack including the chassis including the storage node that includes the first storage device or the second storage device storing the one of the one or more replicated chunk files selected.

4. The method of claim 1, further comprising:
   associating the one or more replicated chunk files selected in the data protection grouping container by updating the metadata table to indicate the one or more replicated chunk files are associated with the data protection grouping container without writing the one or more replicated chunk files associated with the data protection grouping container to a new chunk file.

5. The method of claim 4, further comprising:
updating the metadata table to include an entry, corresponding to the data protection grouping container, that associates the one or more replicated chunk files selected with a corresponding storage device of a storage system.

6. The method of claim 1, further comprising:
analyzing a repository of replicated chunk files to select the one or more replicated chunk files; and
wherein the analyzing includes selecting and including a first replicated chunk file in the data protection grouping container and selecting a second replicated chunk file based on the second replicated chunk file satisfying combination criteria.

7. The method of claim 6, further comprising:
determining whether the second replicated chunk file satisfies the combination criteria.

8. The method of claim 7, further comprising:
associating the second replicated chunk file with the data protection grouping container based on determining the second replicated chunk file satisfies the combination criteria.

9. The method of claim 8, further comprising determining whether the data protection grouping container is full based on an erasure coding configuration.

10. The method of claim 9, wherein the erasure coding configuration indicates a number of data stripes and a number of parity stripes to include in the data protection grouping container.

11. The method of claim 1, wherein the one or more replicated chunk files selected and one or more parity stripes generated are stored on different storage devices of a storage system.

12. The method of claim 1, further comprising:
monitoring the data protection grouping container; and
performing a garbage collection process.

13. The method of claim 12, wherein the garbage collection process includes determining whether a measure of unreferenced data chunks associated with the data protection grouping container is greater than a threshold measure of unreferenced data chunks.

14. The method of claim 13, further comprising:
generating a new data protection grouping container based on whether the measure of unreferenced data chunks associated with the data protection grouping container is greater than the threshold measure of unreferenced data chunks.

15. The method of claim 14, further comprising:
updating the data protection grouping container based on whether the measure of unreferenced data chunks associated with the data protection grouping container is greater than the threshold measure of unreferenced data chunks.

16. Non-transitory computer-readable storage media encoded with instructions that, when executed, cause one or more processors to:
select one or more replicated chunk files stored on a first storage device associated with an original chunk file stored on a second storage device different than the first storage device;
update a metadata table to indicate the one or more replicated chunk files selected are associated with a data protection grouping container without updating metadata within the one or more replicated chunk files associated with the data protection grouping container; and
apply erasure coding to the data protection grouping container, including utilizing the one or more replicated chunk files associated with the data protection grouping container as different data stripes of the erasure coding and generating one or more parity stripes based on the different data stripes.

17. The non-transitory computer-readable storage media of claim 16, wherein the instructions, when executed, further cause the one or more processors to:
select the one or more replicated chunk files based on combination criteria including at least the one or more replicated chunk files stored on the first storage device different from the second storage device to which the original chunk file is stored.

18. The non-transitory computer-readable storage media of claim 16, wherein the instructions, when executed, further cause the one or more processors to:
associate the one or more replicated chunk files selected in the data protection grouping container by updating the metadata table to indicate the one or more replicated chunk files are associated with the data protection grouping container without writing the one or more replicated chunk files associated with the data protection grouping container to a new chunk file.

19. A system, comprising:
one or more processors; and
memory, coupled to the one or more processors, the memory storing instructions that when executed cause the one or more processors to:
select one or more replicated chunk files stored on a first storage device associated with an original chunk file stored on a second storage device different than the first storage device;
update a metadata table to indicate the one or more replicated chunk files selected are associated with a data protection grouping container without updating metadata within the one or more replicated chunk files associated with the data protection grouping container; and
apply erasure coding to the data protection grouping container, including utilizing the one or more replicated chunk files associated with the data protection grouping container as different data stripes of the erasure coding and generating one or more parity stripes based on the different data stripes.

20. The system of claim 19, wherein the instructions, when executed, further cause the one or more processors to:
associate the one or more replicated chunk files selected in the data protection grouping container by updating the metadata table to indicate the one or more replicated chunk files are associated with the data protection grouping container without writing the one or more replicated chunk files associated with the data protection grouping container to a new chunk file.

* * * * *